(12) United States Patent  
Sanders

(10) Patent No.: US 6,349,283 B1  
(45) Date of Patent: Feb. 19, 2002

(54) REMOTE CONTROL AND PROCESSING OF WIRELESS DIGITAL RECEIVER

(76) Inventor: Glenn Sanders, 235 Old Wood Rd., Franklin Lakes, NJ (US) 07417

( * ) Notice: Subject to any disclaimer, the term of this patent is extended or adjusted under 35 U.S.C. 154(b) by 0 days.

(21) Appl. No.: 09/263,660

(22) Filed: Mar. 5, 1999

(51) Int. Cl.[7] .............................................. G01L 21/00
(52) U.S. Cl. ......................... 704/278; 381/74; 381/82; 448/143; 455/208
(58) Field of Search ................................ 704/275, 278, 704/200, 201, 226; 448/143; 455/208, 258; 381/74, 79, 82; 84/617

(56) References Cited

U.S. PATENT DOCUMENTS

| | | | | |
|---|---|---|---|---|
| 4,099,437 A | * | 7/1978 | Stavron et al. ................ 84/617 |
| 5,375,260 A | * | 12/1994 | Koike ......................... 455/208 |
| 5,619,582 A | * | 4/1997 | Oltman et al. ................. 381/82 |
| 5,654,750 A | * | 8/1997 | Weil ........................... 448/143 |
| 5,982,904 A | * | 11/1999 | Eghtesadi et al. ............. 381/74 |
| 6,157,908 A | * | 12/2000 | O'Gwynn .................... 704/226 |
| 6,188,985 B1 | * | 2/2001 | Thrift et al. ................. 704/275 |

* cited by examiner

*Primary Examiner*—David D. Knepper  
(74) *Attorney, Agent, or Firm*—Abelman, Frayne & Schwab

(57) ABSTRACT

An integrated receiver mixer system is disclosed wherein the plurality of wireless receivers is remotely controlled, and retained in synchronism, via reference and control signals outputted by the system mixer. Further, pairs of receivers are connected to each other, and to the mixer, in a manner which minimizes the requisite cabling therebetween.

14 Claims, 2 Drawing Sheets

REMOTE CONTROL AND PROCESSING OF WIRELESS DIGITAL RECEIVER

FIELD OF INVENTION

The present invention relates to an integrated receiver/mixer system for the remote control of wireless receivers by the mixer reference and control signals which are cable connected to the wireless receivers. The inputted signals are combined in the receivers with the wireless audio and returned to the mixer with receiver status information. The control signals and information to and from the receiver and the mixer are transmitted therebetween with a minimum of cabling, and digitally presented and processed, with the mixer and receivers being continually maintained in synchronism.

BACKGROUND OF THE INVENTION

During motion picture or television filming, wireless microphones are conventionally concealed inside the clothing, or hair, of the performer during filming. Audio intelligence is then advantageously digitally encoded onto a carrier wave and wireless transmitted to a receiver. One or more receivers may be provided for receiving the signal from each performer, depending upon such factors as the locale of the area and degree of movement of the performer during the particular sequence being filmed. Each performer's microphone signal is wirelessly transmitted to receiver(s) which will be tuned to its carrier frequency. The receivers, which operate in conjunction with the several performer's wireless microphone transmission, are then connected to a mixer, where the individual audio signals of each performer are appropriately analyzed and intermixed to provide the desired composite audio output. Various reference and control signals must be provided between the mixer and receivers including signals to insure appropriate synchronization therebetween. Further, in many instances receivers may be located several hundred feet away from the mixer, thereby necessitating numerous lengthy cable runs. This has oftentimes necessitated cumbersome and costly system setups.

SUMMARY OF THE INVENTION

The present invention provides an integrated receiver/mixer system for the processing and transmission of the digitally encoded information received from the wireless microphone transmitters in which, among other advantages, the wireless system is remotely controlled from the mixer. The receiver, in addition to inputting the digitally encoded wireless intelligence signal from the microphone transmitter, receives and processes digitally encoded control and reference signals from the mixer for establishing the receiver parameters and synchronizing the receiver to the mixer, as by establishing such parameters as the sample rate, and the receiver frequency.

As a further advantage, which substantially minimizes the system cabling, a second receiver, which is to be tuned to a different frequency designated to operate in conjunction with the microphone transmitter of a second performer, is cable connected to a first receiver which is to be tuned to a first performer's frequency. The first receiver is cable connected to the mixer output and receives the reference and control signals for both receivers. The first receiver will appropriately process the reference and control signals intended for it, while passing on the reference and control signals to the second receiver, together with its own audio and status information. The second receiver will in turn respond to its reference and control signals being transmitted to it from the mixer, but via the first receiver, and provide an output signal, to the mixer input, which will include the audio and status information of both receivers. The mixer may preferably include a status screen for displaying the information from both receivers. Thus, the remotely located mixer controls both receivers with there being a minimum of cable runs between the mixer and the receivers.

Advantageously, additional receiver sets can be included within the system for processing the digitally encoded wireless transmission of additional performers, with such receivers similarly receiving reference and control signals from the same mixer, and a single cable from the mixer providing the reference and control signals to two such receivers, and a single cable back from the other one of such additional receivers providing the audio and status information back to another input terminal of the mixer. The status screen at the mixer will accordingly display the receiver status information of such plurality of receivers which are controlled by the single mixer, with minimal cabling, in accordance with the novel system approach of the present invention.

In accordance with preferred features of the present system, the cable connections are coaxial cables, and the digital audio signal is an AES/EBU formatted signal, with the signal from the mixer to the receivers establishing a digital sample rate in synchronism with the mixer.

Accordingly, it is a primary object of the present invention to provide an integrated receiver/mixer system for the processing and transmission of digitally encoded information in which the mixer remotely controls the wireless system and obtains audio and status data therefrom.

A further object of the present invention is to provide such an integrated receiver/mixer system which includes a minimum number of cable runs between the mixer and the receivers.

Yet a further object of the present invention is to provide such an integrated receiver/mixer system in which digitally encoded reference and control signals are sequentially applied to two interconnected receivers operating at different frequencies, with the audio and status information of both receivers being returned to the mixer on a single coaxial cable.

An additional object of the present invention is to provide such a system in which the digital audio signal may be an AES/EBU formatted signal.

These as well as other objects of the present invention will become apparent upon a description of the following drawings.

DETAILED DESCRIPTION

Figure 1:
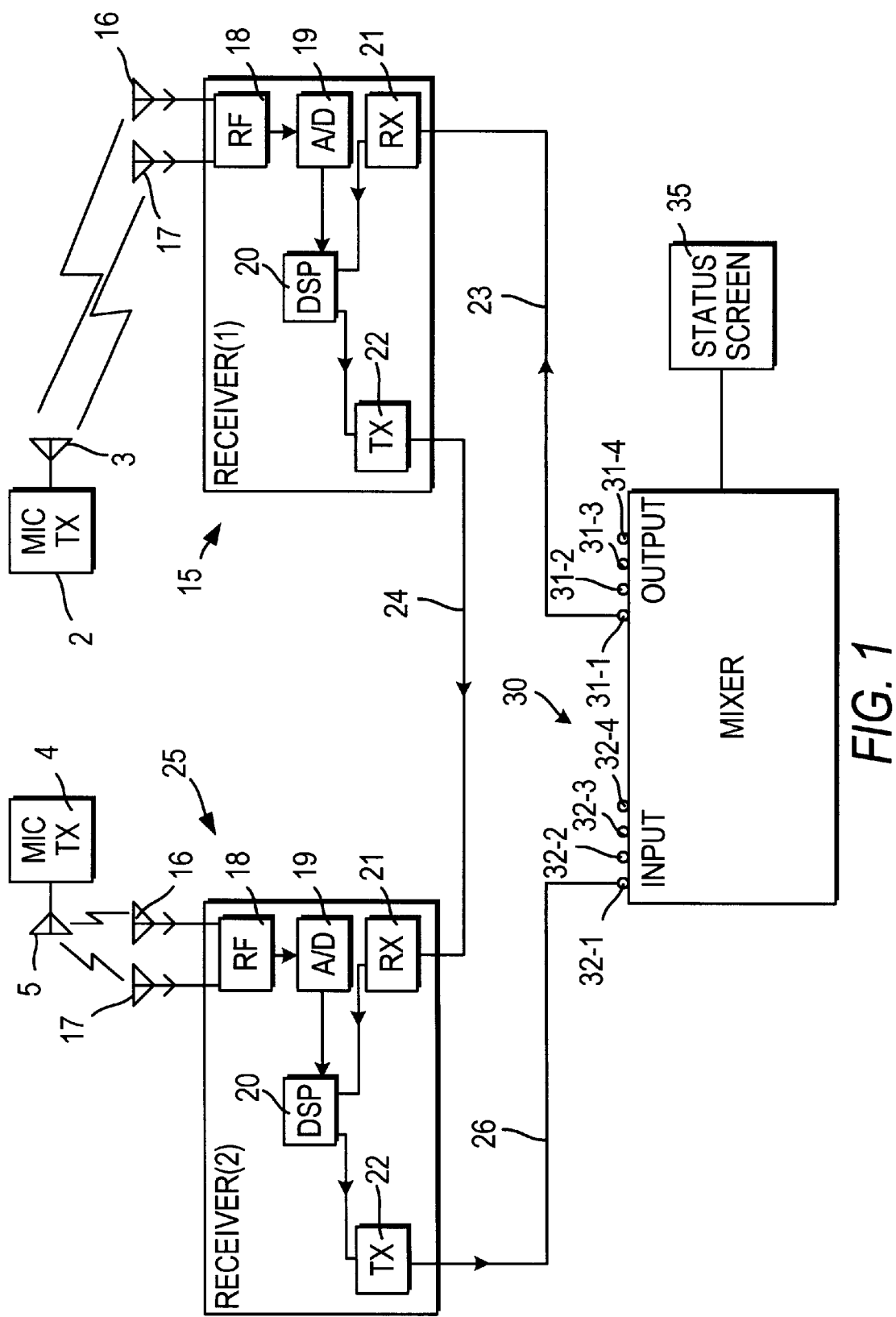
FIG. 1 is a block diagram of an integrated receiver/mixer system utilizing two receivers in accordance with the present invention.

Reference is initially made to FIG. 1 which shows two transmitting microphones 2,4 each of which will be placed on the person of an individual performer, such as within the clothes or hair. Each of these microphone transmitters converts the performer's audio to a digital form which will be reformulated to an analog carrier and transmitted by their respective antennas 3 and 5. Each of the microphones will be transmitting at a different carrier frequency such that it is picked up by its intended receiver. A receiver 15 is provided for processing the audio signal from transmitting microphone 2 and a similar receiver 25 is provided for microphone 4. Each of the receivers 15, 25 preferably includes a pair of antennas 16, 17 which are provided for multiphase reception in accordance with known diversity techniques. Each of the receivers further includes an RF receiver 18 to which the signal from the antennas 16 and 17 is presented, an analog to digital converter 19 for converting the output of RF receiver 18, and a digital signal processor 20. Each of the receivers 15 and 25 further includes a digitally encoded receiver 21 and transmitter 22 which operate in conjunction with the mixer 30 as hereinafter discussed.

Mixer 30 preferably includes a plurality of output terminals, shown as 31-1 through 31-4 and a plurality of input terminals, shown as 32-1 through 32-4. It is naturally understood that this is merely illustrative with a different number of input and output terminals being employed in accordance with the requirements of the particular system. Mixer 30 will generate a pair of digitally encoded reference and control signals which are presented, via coaxial cable 23, to the input of receiver 21. This signal will include the reference and control signals for both receivers 15 and 25. Among other parameters, it will include a receiver identifier, establish the frequencies of receivers 15 and 25 (to correspond to the frequencies of the transmitting microphones 2 and 4) and the digital sample rate of the digitally encoded audio thereto, such that the mixer 30 and receivers 15 and 25 will be in proper synchronization. Typically, the digital signal may be in the well known AES/EBU format, although other digitally formatted signals may be employed in accordance with the overall system operation of the present invention. Further, timing information is extracted by both of receivers 15 and 25 from the reference signal mixer output presented thereto, such that the receivers and mixer are in synchronism. In operating in conjunction with the AES/EBU formatted signal, they may typically be operating at a sample rate of 48 Khz. Since each of the individual receivers 15 and 25 has its own identifying number, it will only respond to a control signal from the mixer 30 which includes that identifying number. The reference and control signal presented to receiver block 21 of wireless receiver 15 appropriately establish the parameters of receiver 15, which is then presented to the input of digital signal processor 20, wherein it is combined with the digital audio signal from A/D converter 19, and presented to transmitter portion 22. The audio and status output of transmitter 22 within receiver 15 is then connected by coaxial cable 24 to the input block 21 of receiver 25. The receiver 25 control signal will be appropriately processed within its receiver block 21 to set the parameters of receiver 25, with the digital signal processor 20 of receiver 25 combining the output of its receiver block 21 with the digital audio output of the audio to digital converter 19 of receiver 25, thereby presenting the audio and status information of both receivers 15 and 25 to the output of transmitter 22, where it is thereafter transmitted via coaxial cable 26 to the input terminal 32-1 of mixer 30. In the well known manner, a status screen 35 may optionally be provided in association with mixer 30 to enable the operator to readily view the conditions of, and audio signal received from, each of receivers 15 and 25. It should therefore be readily appreciated that wireless receivers 15 and 25 are advantageously being remotely controlled by the output signal of mixer 30. Further, the audio and status signals of each of the receivers 15, 25 are then advantageously combined and transmitted to the mixer 30 via a single coaxial cable 26. Since the coaxial cables 23 and 26 can, in typical installations, be several hundred feet long, with the coaxial connection 24 typically being substantially shorter, the present system significantly minimizes the requisite cable runs between the wireless receivers 15, 25 and mixer 30.

Figure 2:
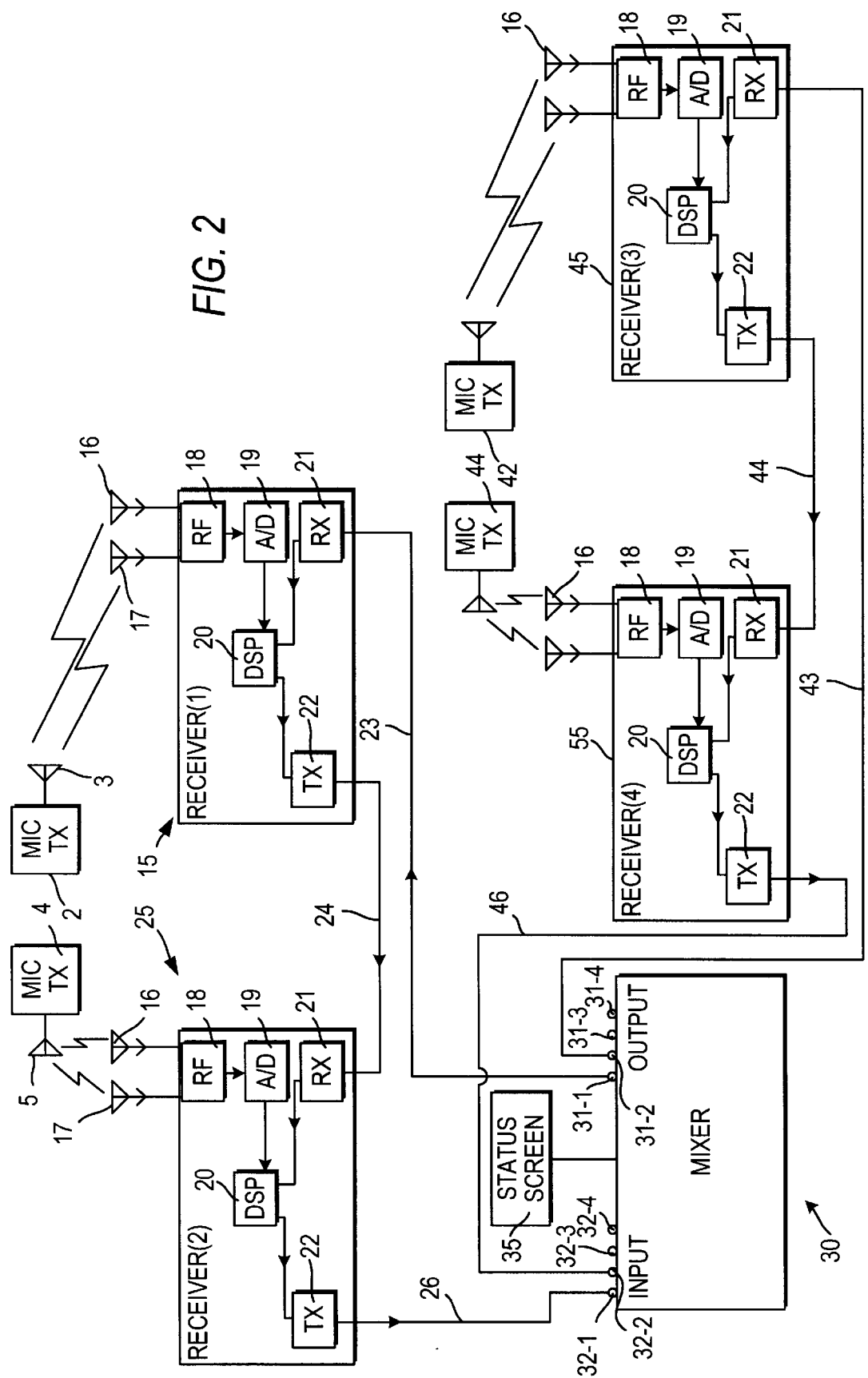
FIG. 2 is a modified block diagram corresponding to FIG. 1, but including additional third and fourth receivers.

Reference is now made to FIG. 2 which shows the expansion of the system of FIG. 1 to include two additional transmitting microphones 42, 44 which correspond to microphones 2 and 4, but are intended to be worn by different performers, and hence operate at different carrier frequencies. Receivers 45, 55 are associated with microphones 42, 44, respectively, each of which receivers corresponds to receivers 15 and 25, except that they each have their own individual identifying number, and are set at different frequencies to be compatible with microphone transmitters 42, 44, respectively. Output terminal 31-2 of mixer 30 presents the reference and control signals for receivers 45, 55 via coaxial cable 43. Receiver 45 will only extract those control signals having its identifying number, so as to appropriately set receiver 45, with the reference and control signal for receiver 55, in association with the audio and status output of receiver 45 being outputted at coaxial cable 44 to the input of receiver block 21 of receiver 55. Receiver 55, operating in a like manner as receiver 25. It will respond to the control signals having its identifying number, and provide an output at coaxial cable 46 which includes the audio and status information of both receivers 45 and 55. Accordingly, the status screen 35 will now provide the mixer operator with the information pertaining to receivers 15, 25, 45, and 55. It should naturally be appreciated that additional receiver pairs (not shown) may be connected to the additional input and output terminals of the mixer 30 so as to appropriately coordinate the operation with as many receivers that may be required in accordance with the number of performers utilizing transmitting microphones having a digitally encoded wireless output.

Although the present invention has been described in conjunction with a preferred embodiment, it should naturally be understood that various modifications may be made thereto. For example, different types of digital formatted signals may be used other than the AES/EBU system, Likewise the system may be utilized in conjunction with digitally encoded and wireless transmitted video intelligence. Accordingly, it is intended that the invention be defined by the scope of the following claims:

I claim:

1. An integrated receiver/mixer system for the processing and transmission of digitally encoded information, comprising:
   a. at least one receiver including
      (i) a first means for the wireless reception of a digitally encoded intelligence signal,
      (ii) a second means for receiving and processing both (a) a digitally encoded control signal from a remote location for establishing first preselected receiver parameters, and (b) a digitally encoded reference signal from the same remote location for establishing second preselected receiver parameters,
      (iii) third means for digitally processing said intelligence signal, control signal and reference signal to provide a combined digital output signal of the received intelligence and receiver status, and
      (iv) fourth means for transmitting said combined digital output signal;
   b. a mixer at said remote location, said mixer including
      (i) means for generating and outputting said digitally encoded reference and control signals to said receiver, (ii) means for inputting the combined digital output signal being transmitted from said receiver, and (iii) a status screen for displaying receiver status information;

c. (i) a first cable connection between the output of said mixer and said second means of said receiver, (ii) a second cable connection between said fourth means of said receiver and the input of said mixer, whereby said mixer at a location remote from said receiver controls the operation of said receiver via the digitally encoded signal transmitted to said receiver through said first cable, and the combined digital output signal of said receiver is transmitted to said mixer through said second cable.

2. An integrated receiver/mixer system according to claim 1, wherein, said digitally encoded intelligence signal is an audio signal, and said combined digital output signal includes audio and receiver status information.

3. An integrated receiver/mixer system according to claim 1, wherein said digitally encoded control signal includes a digital command to set the receiver frequency.

4. An integrated receiver/mixer system according to claim 2, wherein said digitally encoded reference signal establishes a digital sample rate for said audio signal and maintains said receiver in synchronism with said mixer.

5. An integrated receiver/mixer system for the processing and transmission of digitally encoded information, comprising:

a. at least two receivers, each including
(i) a first means for the wireless reception of a digitally encoded audio signal,
(ii) second means for receiving and processing both (a) a digitally encoded control signal from a remote location for establishing first preselected receiver parameters, and (b) a digitally encoded reference signal from the same remote location for establishing second preselected receiver parameters,
(iii) third means for digitally processing said audio signal, control signal and reference signal to provide a combined digital output signal of the received audio and receiver status, and
(iv) fourth means for transmitting said combined digital output signal;

b. a mixer at said remote location, said mixer including:
(i) means for generating and outputting said digitally encoded reference and control signals to said receivers, and
(ii) means for inputting the combined digital output signal being transmitted from said receivers;

c. (i) a first cable connection between the output of said mixer and sad second means of a first one of said receivers,
(ii) a second cable connection between said fourth means of the other of said receivers and the input of said mixer,
(iii) a third cable connection between the fourth means of said first receiver and second means of said second receiver, said digitally encoded control signal includes digital commands to set different frequencies for said first and second receivers, said second cable means is a single cable to said receiver status information for both of said first and second receivers to a single input of said mixer;

whereby said mixer at a location remote from said receiver controls the operation of both of said receivers via the digitally encoded signal transmitted to said receivers through said first cables, and the combined audio and status information of said first and second receivers is transmitted to said mixer through said second cable, such that two discrete audio signals are transmitted by a single cable.

6. An integrated receiver/mixer system according to claim 5, wherein said digitally encoded reference signal establishes the same digital sample rate for said audio signal in said first and second receiver and maintains said receivers in synchronism with each other and said mixer.

7. An integrated receiver/mixer system according to claim 6, wherein said cables are coaxial cables and said digital audio signal is an AES/EBU formatted signal.

8. An integrated receiver/mixer system according to claim 5, further including a third and fourth receiver, each including said first, second, and a third means, said mixer including a second output and a second input, a fourth cable means connected between said second mixer output and said second means of said third receiver to transmit digitally encoded reference and control signals for said third and fourth receivers, a fifth cable means connected between said fourth means of said third receiver and second means of said fourth receiver, and a fifth cable means connected between the fourth means of said fourth receiver and second input of said mixer, the digitally encoded coaxial signal presented to said third receiver setting different frequencies for said third and fourth receivers, which differ from the frequencies of said first and second receiver, said fifth cable means is a single cable to provide audio and receiver status information of both of said third and fourth receivers to the second input of said mixer, whereby said mixer at a location remote from all of said receivers, controls the operation of all of said receivers via the digitally encoded signal outputs of said mixer, and the audio and status information of all of said receivers is transmitted to the inputs of said mixer, and a mixer status screen provides a display at said mixer of the conditions at each of said receivers.

9. An integrated receiver/mixer system according to claim 8, wherein the digitally encoded reference signal of said mixer establishes the same digital sample rate for the audio signal received by each of said receivers, and maintains each of said receivers in synchronism with each other and with said mixer.

10. In combination with a plurality of wireless digital receivers for receiving digitally modulated audio intelligence from a plurality of transmitters, each of said receivers including an input and output terminal, a digital mixer at a location remote from said plurality of receivers, said mixer including input terminal means and output terminal means, the input terminals of said receivers operatively connected to the output terminal means of said mixer, and the output terminals of said receivers operatively connected to the input terminal means of said mixer, said mixer output terminal means providing digital reference and control signals to remotely control the operation of said receivers.

11. The combination of claim 10, wherein said receiver output terminals provide their individual audio and status information to the input means of said mixer.

12. The combination of claim 11, wherein pairs of said receivers are cable connected together, whereby a first one of each pair of said receivers connected by a first mixer connection cable to one output terminal of said mixer output means, and a second one of each pair of said receivers connected by a second mixer connection cable to one input terminal of said mixer input means, whereby a single input and output terminus of said mixer remotely control and receive signals from a pair of receivers.

13. The combination of claim 12, wherein each of said receivers is digitally controlled by said mixer to operate at a different frequency.

14. The combination of claim 12, wherein each of said receivers is digitally controlled by said mixer to operate in synchronism with each other and with said mixer.

\* \* \* \* \*